(12) United States Patent
Grzesiak et al.

(10) Patent No.: US 11,454,498 B2
(45) Date of Patent: Sep. 27, 2022

(54) COORDINATE MEASURING SYSTEM

(71) Applicant: Carl Zeiss Industrielle Messtechnik GmbH, Oberkochen (DE)

(72) Inventors: Andrzej Grzesiak, Oberkochen (DE); Heiko Goller, Obersulm (DE); Thomas Mayer, Kolbermoor (DE)

(73) Assignee: Carl Zeiss Industrielle Messtechnik GmbH, Oberkochen (DE)

(\*) Notice: Subject to any disclaimer, the term of this patent is extended or adjusted under 35 U.S.C. 154(b) by 425 days.

(21) Appl. No.: 16/670,982

(22) Filed: Oct. 31, 2019

(65) Prior Publication Data
US 2020/0132450 A1    Apr. 30, 2020

(30) Foreign Application Priority Data

Oct. 31, 2018    (DE) ..................... 10 2018 127 221.9

(51) Int. Cl.
*G01B 21/04*    (2006.01)
*G01B 11/25*    (2006.01)
*G01B 5/008*    (2006.01)
*G06T 7/521*    (2017.01)

(52) U.S. Cl.
CPC .............. *G01B 21/04* (2013.01); *G01B 5/008* (2013.01); *G01B 11/2545* (2013.01); *G06T 7/521* (2017.01); *G05B 2219/37193* (2013.01)

(58) Field of Classification Search
CPC .... G01B 21/04; G01B 5/008; G01B 11/2545; G01B 11/25; G01B 11/002; G01B 11/26; G01B 11/005; G06T 7/521; G06T 7/60; G06T 2207/10152; G06T 2207/30164; G05B 2219/37193
See application file for complete search history.

(56) References Cited

U.S. PATENT DOCUMENTS

| | | | |
|---|---|---|---|
| 7,015,418 B2 * | 3/2006 | Cahill | B23K 26/04 257/E23.179 |
| 8,345,954 B2 * | 1/2013 | Daxauer | G01B 11/2545 382/128 |
| 10,036,628 B2 * | 7/2018 | Held | G01B 11/007 |
| 10,648,792 B2 * | 5/2020 | Held | G06T 7/73 |

(Continued)

FOREIGN PATENT DOCUMENTS

DE        10137241 A1    9/2002
DE    102007042963 A1    3/2009

*Primary Examiner* — Yaritza Guadalupe-McCall
(74) *Attorney, Agent, or Firm* — Miller Johnson

(57) ABSTRACT

A coordinate measuring system includes a scanning module having a laser line scanner and a projection device. The laser line scanner projects a laser line onto a surface of a workpiece and produces scan data from a reflection of the laser line. The projection device and/or the laser line scanner project three optical markers onto the surface of the workpiece, at least one of the three markers being disposed on the laser line and at least one of the three markers being at a distance from the laser line. The coordinate measuring system includes an optical sensor capturing image data of the three optical markers and an evaluation device determining a position and an orientation of the coordinate system of the laser line scanner in the coordinate system of the optical sensor based on the image data of the optical sensor and the scan data of the laser line scanner.

20 Claims, 10 Drawing Sheets

(56) References Cited

U.S. PATENT DOCUMENTS

| | | | |
|---|---|---|---|
| 2004/0031779 A1* | 2/2004 | Cahill | G06K 1/126 257/E23.179 |
| 2015/0015701 A1* | 1/2015 | Yu | H04N 5/2259 348/136 |
| 2018/0094913 A1* | 4/2018 | Held | G01B 11/002 |
| 2018/0094914 A1* | 4/2018 | Held | G01B 11/002 |
| 2020/0132450 A1* | 4/2020 | Grzesiak | G01B 11/002 |
| 2021/0190483 A1* | 6/2021 | Ilg | G01B 11/005 |

* cited by examiner

COORDINATE MEASURING SYSTEM

CROSS REFERENCE TO RELATED APPLICATIONS

This application claims priority to German patent application DE 10 2018 127 221.9, filed Oct. 31, 2018, the entire content of which is incorporated herein by reference.

TECHNICAL FIELD

This disclosure relates to a coordinate measuring system, a coordinate measuring method, and the use of a coordinate measuring system for carrying out the coordinate measuring method.

BACKGROUND

Coordinate measuring systems or coordinate measuring machines (CMMs) serve to check workpieces, for example as part of quality assurance, or to determine the geometry of a workpiece completely as part of what is known as "reverse engineering". Moreover, diverse further application possibilities are conceivable, e.g., process-controlling applications, in which the measurement technique is applied directly for online monitoring and regulation of manufacturing and processing processes.

In coordinate measuring systems, different types of sensors may be used to capture the workpiece to be measured. In addition to sensors measuring on a tactile basis, use is predominantly also made of optical sensors that facilitate a contactless capture of the coordinates of a test object or workpiece.

One type of optical measuring technique is based on the so-called laser line scanning (also referred to as laser scanning), in which a surface of a workpiece to be measured is passed over in point-by-point fashion, in lines or else in the form of a grid by a laser beam. If the laser beam is fanned open, for example, by way of an optical element such as, e.g., a specific lens element or a moving mirror (so-called mirror scanner), this is generally referred to as a laser line scanner. When passing over a surface to be measured, an image of the surface can be produced in a coordinate system of the laser scanner with the aid of the laser line scanner which, for example, includes an optical sensor. The underlying mathematical-physical principle in this case is generally known as a triangulation principle.

When capturing the geometry in the coordinate system of the laser scanner, the laser radiation of the laser line projected onto the workpiece that has been reflected by the workpiece, for example, is captured. By way of example, the reflected radiation includes distance information between the surface of the workpiece and the laser scanner. The geometry of the workpiece in the coordinate system of the laser scanner can be determined by way of the point-by-point, line-by-line, or grid-type evaluation, for example, by an evaluation device. Convertibility between the coordinate system of the laser scanner and an external coordinate system (e.g., a spatial reference system) is necessary for further use of this dimensional information about the geometry of the workpiece (e.g., in a further manufacturing step).

In order to ensure such a convertibility or transformability, the origin or the position and/or orientation of the laser scanner shall be able to be determined in the external coordinate system. This type of determination is particularly necessary if the laser scanner is a moving laser scanner, for example, a manually guided laser scanner. In general, one or more optical sensors or cameras are used for this determination, said optical sensors or cameras being disposed in a space surrounding the laser scanner and having the external coordinate system as a common reference point.

The position and/or orientation of the laser scanner is often determined by evaluating image data, for example on the basis of optical markers. By way of example, the optical markers can be disposed on the laser scanner (e.g., as a sticker) and serve to render unique reference points identifiable in the respective image region of the optical sensor, the position and/or orientation of the laser scanner being determinable on the basis of the position of said reference points. Once the position and orientation of the laser scanner have been determined in the external coordinate system, the dimensional information about the workpiece can be converted from the coordinate system of the laser scanner into the external coordinate system (see FIG. 10 relating to the prior art).

Particularly in the case of mobile, e.g., manually guided CMMs (or mobile laser scanners), which are used in the automotive sector, for example, it is particularly important to know uniquely the position and orientation of the mobile coordinate measuring machine in the external coordinate system at all times during a coordinate measuring process. To this end, the mobile coordinate measuring machines are tracked during the entire measurement process, for example by one or more optical sensors, as described above. By way of example, a plurality of optical markers are disposed on the mobile coordinate measuring machines to this end. The optical markers are known in the external coordinate system as a result of a calibration of the coordinate measuring system (between the cameras in space and the laser scanner). The position of the optical markers is determined in the external coordinate system during the measurement. If the position of the optical markers is known in both coordinate systems, a transformation (transformation matrix) can be determined therefrom.

Especially if the form of test objects or workpieces should be measured with an accuracy in the micrometer range, the usual approaches of tracking on the basis of optical markers have the problem that even small measurement errors when capturing the position and orientation (pose) of the laser scanner may lead to an incorrect determination of the geometry of the workpiece to be measured within the scope of the transformation into the external coordinate system. As a result, subsequent errors, for example, may arise when processing the workpiece on the basis of the incorrectly determined geometry.

Additionally, the measurement errors multiply with increasing working distance between the workpiece to be tested and the laser scanner. That means in other words, possible measurement uncertainties when capturing individual optical markers are multiplied with increasing working distance by a transmission ("projection") onto the workpiece. Especially measurement errors when capturing the orientation of the optical sensor multiply at a large working distance as already very small measurement errors of the rotational angle about, e.g., one of the three axes of the coordinate system of the laser scanner lead to a multiplied measurement error by "tilting" when determining the geometry of the workpiece in the external coordinate system (see FIG. 11 relating to the prior art).

The problem can be additionally amplified, for example during an occurrence of opposing measurement errors. By way of example, measurement errors when determining two rotational degrees of freedom can overlay in constructive fashion, as a result of which the resultant overall measurement error is increased in the external coordinate system when determining the geometry of the workpiece to be measured (see FIG. 12 relating to the prior art).

DE 10 2007 042 963 A1 discloses a measuring system in which a pattern is projected onto the workpiece to be measured with the aid of a projector, said pattern being observed simultaneously by a 3D sensor and by external cameras. As a result of this simultaneous observation of the pattern, the 3D sensor and the external cameras can be calibrated relative to one another. Since the position of the pattern is captured both by the 3D sensor and by the external cameras, it can be counted back and forth between the coordinate system of the 3D sensor and the external coordinate system of the cameras without problems or the position and orientation of the coordinate system of the 3D sensor can be determined without problems in the external coordinate system, respectively.

However, if a laser line scanner is used in place of the 3D sensor, this type of conversion with the approach chosen in DE 10 2007 042 963 A1 is not possible, since the laser line scanner captures the workpiece only line-by-line and not in three-dimensional or areal fashion, and hence the position of the areal pattern is not completely capturable by the laser line scanner and therefore the position of the pattern is not known in the coordinate system of the laser line scanner.

SUMMARY

It is an object to provide a coordinate measuring system, in which a laser line scanner can be used but the aforementioned measurement errors can nevertheless be minimized.

According to a first aspect, a coordinate measuring system is provided, which includes:
- a scanning module having a laser line scanner and a projection device, wherein the scanning module defines a first coordinate system that is body-fixed with respect to the scanning module, wherein the laser line scanner is configured to project a laser line onto a surface of a workpiece and produce scan data from a reflection of the laser line being reflected from the surface of the workpiece, wherein the projection device is configured to project a first optical marker, at a distance from the laser line, onto the surface of the workpiece, wherein the first optical marker is disposed along a first direction that is predefined in the first coordinate system, wherein the projection device or the laser line scanner is configured to project a second optical marker onto the laser line, wherein the second optical marker is disposed along a second direction that is predefined in the first coordinate system, and wherein the projection device or the laser line scanner is further configured to project a third optical marker onto the surface of the workpiece, wherein the third optical marker is disposed along a third direction that is predefined in the first coordinate system;
- an optical sensor that defines a second coordinate system that is body-fixed with respect to the optical sensor, said optical sensor being configured to capture image data of the first optical marker, the second optical marker and the third optical marker; and
- an evaluation device that is configured to determine a first position of the first optical marker, a second position of the second optical marker and a third position of the third optical marker in the second coordinate system based on the image data, to determine a fourth position of the second optical marker in the first coordinate system based on the scan data, and to determine a position and orientation of the first coordinate system with respect to the second coordinate system based on the first to fourth position and the first to third direction.

According to a second aspect, a coordinate measuring method is provided which includes the following steps:
- producing a laser line onto a surface of a workpiece;
- projecting a first optical marker onto the surface of the workpiece, wherein the first optical marker is at a distance from the laser line, wherein the first optical marker is disposed along a first direction that is predefined in a first body-fixed coordinate system;
- projecting a second optical marker onto the laser line, wherein the second optical marker is disposed along a second direction that is predefined in the first coordinate system;
- projecting a third optical marker onto the surface of the workpiece, wherein the third optical marker is disposed along a third direction that is predefined in the first coordinate system;
- determining a first position of the first optical marker, a second position of the second optical marker and a third position of the third optical marker in a second body-fixed coordinate system;
- determining a fourth position of the second optical marker in the first body-fixed coordinate system; and
- determining a position and orientation of the first coordinate system with respect to the second coordinate system on the basis of the first to fourth position and the first to third direction.

According to a third aspect, a coordinate measuring system is provided including:
- a scanner configured to produce a laser line onto a surface of a workpiece, to project a first optical marker onto the surface of the workpiece, wherein the first optical marker is at a distance from the laser line and disposed along a first direction that is predefined in a first body-fixed coordinate system, to project a second optical marker onto the laser line, wherein the second optical marker is disposed along a second direction that is predefined in the first coordinate system, and to project a third optical marker onto the surface of the workpiece, wherein the third optical marker is disposed along a third direction that is predefined in the first coordinate system;
- a computation device including an electronic circuitry which is configured to determine a first position of the first optical marker, a second position of the second optical marker and a third position of the third optical marker in a second body-fixed coordinate system, to determine a fourth position of the second optical marker in the first body-fixed coordinate system, and to determine a position and orientation of the first coordinate system with respect to the second coordinate system based on the first to fourth position and the first to third direction.

Since at least one of the three optical markers is disposed on the laser line and at least one of the three optical markers is at a distance from the laser line, the projection directions of the optical markers (referred to as "first to third direction" in the present case) are known and since the three optical markers can be captured externally by way of the optical sensor, the position and orientation of the body-fixed coordinate system of the scanning module (referred to as "first coordinate system" in the present case) can be determined in the external coordinate system or in the body-fixed coordinate system of the optical sensor (referred to as "second coordinate system" in the present case), respectively.

The three optical markers do not lie on a common line and consequently form a reference that is expedient for triangulation (e.g., a triangle). The position of the at least one optical marker disposed on the laser line (referred to as "second optical marker" in the present case) is known both in the first and the second coordinate system as this optical marker is capturable both by the laser line scanner and by the external optical sensor. Consequently, this optical marker serves as a common reference. By contrast, the position of the at least one optical marker at a distance from the laser line (referred to as "first optical marker" in the present case) is predefined only in the second coordinate system as this optical marker is capturable only by the optical sensor and not by the laser line scanner. Further, the projection directions of the optical markers are known, both in the first and second coordinate system, to be precise. With the aid of these parameters, the position and orientation of the first coordinate system can be determined very exactly and virtually without errors in the second coordinate system.

The scanning module including the laser line scanner and the projection device defines the first coordinate system. The first coordinate system is fixed with respect to the scanning module. The laser line scanner produces a laser beam that is fanned open, for example by way of a suitable optic, e.g., a cylindrical lens or a moving mirror. The fanned-open and/or moving laser beam projects the laser line when striking the surface of the workpiece. The length of the laser line is defined by way of a working distance between the scanning module and the workpiece surface and an aperture angle of the fanned-open and/or moving laser beam. The laser scanner captures the component of the laser line and/or of the laser radiation reflected by the workpiece surface in the form of scan data. The laser line scanner scans over the surface of the workpiece, for example line-by-line, with the laser line and produces the scan data in the process. By way of example, the scan data includes information about the reflected component of the laser line. The evaluation device can determine the overall geometric nature of the surface of the workpiece by way of the reflected component of the laser line, for example by way of a grid-like evaluation, point evaluation and/or line-by-line evaluation. As a result, the geometry of the surface of the workpiece is known in the first coordinate system.

The projection device of the scanning module can be a projector, for example, which is configured to project the first optical marker. The projection device can be configured to project optical markers with a plurality of forms and refinements and in a plurality of sizes and/or colors.

The first optical marker is projected by the projection device along the first direction onto the surface of the workpiece at a location that is at a distance from the laser line. That means, the first optical marker does not lie on the laser line. The first direction is known in the first coordinate system. This can typically be ensured by a preceding calibration of the projection device in the first coordinate system. Since the laser line scanner scans the workpiece surface, e.g., line-by-line, i.e., typically scans the entire width and length of the tool surface line-by-line, the projection device can be configured to project the first optical marker onto the tool surface so as to be at a distance from the laser line during the entire scanning process.

The second optical marker can be projected onto the laser line along the second direction, either by the laser line scanner or the projection device. The second direction is known in the first coordinate system. The laser line scanner can typically have an additional optic, by which, for example, the second optical marker is projected in the form of a cross onto a location of the laser line. Likewise, the second optical marker can be a point that can uniquely be identified on the laser line, for example one of the endpoints of the laser line. This means in other words, the second optical marker is either additionally projected onto the laser line by the projection device or is embodied as an identifiable point of the laser line. The evaluation device can determine the position of the second optical marker in the first coordinate system on the basis of the scan data. By way of example, the determination can be implemented on the basis of a predefined position of the second optical marker on the laser line by evaluating the reflected component of the laser line or the scan data. This means, a point is already known (fixed) in the first coordinate system as a result of the marked point on the laser line.

The third optical marker can likewise be projected onto the surface of the workpiece along the third direction, either by the laser line scanner or the projection device. The third direction is known in the first coordinate system. If the third optical marker is projected by the laser line scanner, its positioning is set to a position on the laser line. By contrast, if the third optical marker is projected by the projection device, it can be projected either on the laser line or, at a distance therefrom, onto the workpiece surface.

By way of example, the optical sensor can be a camera. In other refinement, the optical sensor may also include a plurality of cameras which, together, define the second, body-fixed coordinate system. Image data are produced by the optical sensor. The image data contain image information about the first to third optical marker, which information can be evaluated by the evaluation device.

By evaluating the image data or the image information within the evaluation device, the respective position of the first to third optical marker is determined in the second coordinate system.

The evaluation device can determine the position and orientation of the first coordinate system in the second coordinate system from the first to third position, known in the second coordinate system, of the first to third optical marker, the position, known in the first coordinate system, of the second optical marker (referred to as "fourth position" in the present case) and the first to third direction known in the first coordinate system. A transformation (transformation matrix) is determinable from the position and orientation of the two coordinate systems with respect to one another. The geometry of the workpiece determined in the first coordinate system can be transformed into the second coordinate system by the transformation.

An advantage of the herein presented coordinate measuring system and coordinate measuring method is that the above-described multiplication of the measurement inaccuracies when determining the position and orientation of the scanning module (i.e., of the coordinate measuring machine) as a result of projecting the first to third optical marker onto the surface of the workpiece can be minimized.

Projecting the optical markers onto the surface of the workpiece by the projection device and/or the laser scanner facilitates a physical decoupling of the optical markers from the scanning module or the coordinate measuring machine. As a result of this decoupling, the coordinate measuring system becomes largely working distance-independent, as a result of which even relatively large working distances are facilitated without an increase in the measurement inaccuracy.

A further advantage is that errors can be avoided by projecting the optical markers onto the workpiece to be measured instead of attaching the optical markers to the scanning module. By way of example, positioning errors when attaching the optical markers lead to deviations in the determination of the position and orientation of the coordinate measuring machine which are avoided.

A further advantage of the herein presented coordinate measuring system is that possibly occurring visibility problems (e.g., by intermittent covering of one of the optical markers, for example when handling a manually guided coordinate measuring machine), can be circumvented by larger working distances, for example.

In a refinement, the projection device or the laser line scanner is configured to project the third optical marker onto the laser line, wherein the evaluation device is configured to determine a fifth position of the third optical marker in the first coordinate system based on the scan data and to determine a sixth position of the first optical marker in the first coordinate system based on the first to third position, the fourth and/or fifth position and the first to third direction, and to determine the position and orientation of the first coordinate system with respect to the second coordinate system based on the fourth to sixth position.

This refinement is advantageous in that, as a result of projecting the third optical marker onto the laser line, the position of said optical marker (the fifth position) can already be determined in the first coordinate system by evaluating the scan data. Consequently, the position of both the second and the third optical marker is determinable in the first coordinate system.

This refinement forms a first case, in which both the second and the third optical marker are projected onto the laser line and only the first optical marker is projected onto the surface of the workpiece at a distance from the laser line. By fixing the two optical markers lying on the laser line in this way, the remaining degrees of freedom for the orientation of the scanning module in the first coordinate system are already very limited. As a result, determining the position and orientation of the first coordinate system with respect to the second coordinate system becomes easier, since only the sixth position of the first optical marker needs to be determined in the first coordinate system. This determination can be implemented either on the basis of the first to third position, the fourth position and the first to third direction or on the basis of the first to third position, the fifth position and the first to third direction.

In a further exemplary embodiment, the projection device is further configured to project the third optical marker onto the surface of the workpiece at a distance from the laser line, wherein the evaluation device is configured to determine a fifth position of the third optical marker in the first coordinate system and a sixth position of the first optical marker in the first coordinate system based on the first to fourth position and the first to third direction, and to determine the position and orientation of the first coordinate system with respect to the second coordinate system based on the fourth to sixth position.

In this refinement, the third optical marker does not lie on the laser line but is projected at a distance therefrom. This refinement forms a second case, in which both the first and the third optical marker are projected onto the surface of the workpiece at a distance from the laser line and only the second optical marker is projected onto the laser line.

By way of example, the projection device can be configured to project both the first optical marker and the third optical marker at two different locations on the workpiece surface, i.e., along two different directions. This refinement is advantageous as it may be very challenging to project two optical markers at two different locations on the laser line, i.e., to label or make identifiable two points on the line, respectively.

According to a further exemplary embodiment, the evaluation device is configured to determine, based on the first to third position, a first distance between the first and second optical marker and a second distance between the first and third optical marker and to determine two first points of intersection with the first direction based on the first distance, wherein one of the two first points of intersection corresponds to the sixth position of the first optical marker in the first coordinate system, or to determine two second points of intersection with the first direction based on the second distance, wherein one of the two second points of intersection corresponds to the sixth position of the first optical marker in the first coordinate system.

This exemplary embodiment relates to the aforementioned first case. The first distance and the second distance are absolute distances between the first and second optical marker and the first and third optical marker, respectively, which are equivalent both in the first and the second coordinate system. By way of the two optical markers projected onto the laser line, the respective position of the second and third optical marker (fourth position and fifth position) is known in the first coordinate system, as a result of which the sixth position of the first optical marker in the first coordinate system can be determined proceeding either from the fourth position or from the fifth position by including the first or second distance. The respective evaluation (proceeding either from the fourth or the fifth position) leads to two possible solutions in each case from the mathematical point of view, of which only one solution in each case corresponds to the sixth position of the first optical marker in the first coordinate system.

According to a further exemplary embodiment, the evaluation device is further configured to determine the two first points of intersection by solving an intersection equation of a first enveloping sphere with a straight line along the first direction, where the first enveloping sphere is defined by way of the fourth position as a sphere center and the first distance as a first radius, or to determine the two second points of intersection by solving an intersection equation of a second enveloping sphere with the straight line along the first direction, wherein the second enveloping sphere is defined by way of the fifth position as a sphere center and the second distance as a second radius.

This refinement relates to the aforementioned first case. This refinement describes the mathematical method carried out by the evaluation device in more detail. The evaluation device solves either an intersection equation (in the first coordinate system) between the first enveloping sphere and the straight line along the first direction, which has the two first points of intersection as a solution, or an intersection equation (in the first coordinate system) between the second enveloping sphere and the straight line along the first direction, which has the two second points of intersection as a solution.

In other exemplary embodiments, the evaluation device may also solve both intersection equations and determine the sixth position on the basis of one of the four solutions which appears most plausible (plausibility check) as the sixth position of the first optical marker on the workpiece surface in the first coordinate system, for example on the basis of predetermined parameters (measurement structure, for measuring the workpiece and/or spatial dimension).

In special cases, the respective intersection equation may also have only one solution, by way of which the sixth position of the first optical marker is already uniquely determined in the first coordinate system. In such a case, the straight line along the first direction is a tangent of the first and/or second enveloping sphere.

According to a further exemplary embodiment, the evaluation device is configured to determine, based on the first to third position, the first distance between the first and second optical marker and a third distance between the second and third optical marker to determine the two first points of intersection with the first direction based on the first distance, wherein one of the two first points of intersection corresponds to the sixth position of the first optical marker in the first coordinate system, and to determine two third points of intersection with the third direction based on the third distance, and wherein one of the two third points of intersection corresponds to the fifth position of the third optical marker in the first coordinate system.

This exemplary embodiment relates to the aforementioned second case. The first distance and the third distance are absolute distances between the first and second optical marker and the second and third optical marker, respectively, which are equivalent both in the first and the second coordinate system. The evaluation device determines the fifth position of the third optical marker proceeding from the fourth position, known in the first coordinate system, using the third distance. The sixth position of the first optical marker is determined by the evaluation device proceeding from the fourth position, known in the first coordinate system, using the first distance.

According to a further exemplary embodiment, the evaluation device is further configured to determine the two first points of intersection by solving an intersection equation of the first enveloping sphere with the straight line along the first direction, wherein the first enveloping sphere is defined by way of the fourth position as a sphere center and the first distance as the first radius, and to determine the two third points of intersection by solving an intersection equation of a third enveloping sphere with a straight line along the third direction, wherein the third enveloping sphere is defined by way of the fourth position as a sphere center and the third distance as a third radius.

In this exemplary embodiment, the evaluation device solves two intersection equations in order to determine the fifth and sixth position of the third and first optical marker in the first coordinate system. This exemplary embodiment relates to the aforementioned second case.

The two enveloping spheres have the same sphere center (the fourth position) and differ on account of the different radii. The one intersection equation leads to two solutions for the fifth position, the other to two solutions for the sixth position. The selection of the respective correct solution, i.e., the selection of the respective correct one of the respective two points of intersection, is typically implemented by the inclusion of predetermined information known in advance. By way of example, one of the two first points of intersection may, in terms of coordinates, lie below or above the workpiece surface to be measured if the measurement structure is considered which forms a rejection criterion when selecting one of the two first points of intersection. By way of example, if the working distance between the scanning module and the workpiece surface is known, this information can be taken into account as selection criterion when selecting the one of the two first points of intersection or second points of intersection by the evaluation device, respectively.

According to a further exemplary embodiment, the evaluation device is configured to determine the fifth position from the two first points of intersection and/or the sixth position from the two second points of intersection or from the two third points of intersection by including a coordinate measuring history.

This exemplary embodiment is advantageous in that, if uncertainty arises when selecting the respective one of the two points of intersection as the fifth or sixth position (for example, if the two points of intersection lie very close together in terms of coordinates, i.e., if the respective straight line intersects the respective enveloping sphere at an outer edge in each case), then a coordinate measuring history can additionally be included.

Such a coordinate measuring history can be stored, for example, in an advantageously present storage device or can be stored continuously therein during a coordinate measurement (real-time storage). By way of example, the coordinate measuring history can in this case include a plurality of geometric measured values (i.e., positions in the first coordinate system) of the workpiece surface that have already been produced by the laser line scanner. By way of example, if a certain position was determined when scanning the workpiece surface by the laser line scanner in a previous measuring step, a statement about an expected positioning of the fifth and/or sixth position of the respective optical marker can be made under certain circumstances proceeding from this position. The selection of the respective one of the two points of intersection can be supported on the basis of this statement.

According to a further exemplary embodiment, the evaluation device is configured to determine the fifth position from the two first points of intersection and/or the sixth position from the two second points of intersection or from the two third points of intersection by including predefined geometric relationships of a coordinate measuring structure of the coordinate measuring system.

In this exemplary embodiment, it is possible to also include predefined distances in the measuring structure, for example the working distance, and already known dimensions of the workpiece or the measuring surroundings. This exemplary embodiment is advantageous in that the predefined, geometric relationships of the coordinate measuring structure typically allows one of the two mathematically possible solutions to be selected and the respective other solution to be rejected.

According to a further exemplary embodiment, the laser line scanner is configured to produce the laser line between two endpoints, wherein the second optical marker is disposed on a first one of the two endpoints.

This exemplary embodiment is advantageous in that an arrangement of the second optical marker on the first of the two endpoints leads to an easy identifiability of the fourth position of the second optical marker, both for the scanning module and for the optical sensor. The two endpoints of the laser line, for example, are defined for the scanning module by way of the working distance and the aperture angle of the fanned-open laser beam, as a result of which the fourth position of the second optical marker is already determinable in the first coordinate system from this information. For the optical sensor, too, the arrangement of the second optical marker on the one of the two endpoints of the laser line is advantageous since the optical sensor can typically delimit the laser line, or the endpoints thereof, from peripheral surroundings of the image region contained in the image data.

According to a further exemplary embodiment, the third optical marker is disposed on the second one of the two endpoints.

This exemplary embodiment is advantageous in that the degrees of freedom of the position of the first coordinate system with respect to the second coordinate system are already restricted by fixing the two endpoints, as a result of which at least the position of the first coordinate system with respect to the second coordinate system can be determined on the basis of the two optical markers disposed at the two endpoints. By projecting at least one further optical marker onto the surface of the workpiece, the orientation of the first coordinate system with respect to the second coordinate system can likewise be determined in addition to the position.

According to a further exemplary embodiment, each of the first to third direction extends obliquely with respect to one another, proceeding from a common origin of the first coordinate system.

In the present case, the term "oblique" means an extent of the first to third direction at respective angles of inclination of >0° and <90°, i.e., at acute angles, with respect to one another.

According to a further exemplary embodiment, the first to third direction include angles of inclination of a same magnitude among one another.

This exemplary embodiment is advantageous in that the three directions to the respective first to third optical marker proceeding from the origin of the first coordinate system span a regular tetrahedron in the direction of the workpiece surface. This regular tetrahedron simplifies the selection of the respective one of the respective two points of intersection when determining the fifth and/or sixth position by way of equivalent geometric orientation relationships between the first to third direction.

It is understood that the refinements specified above apply in equivalent form to the herein presented coordinate measuring method.

It is additionally understood that the abovementioned features and the features still to be explained below apply not only on their own but rather also in any desired combination with one another, without departing from the spirit and scope of this disclosure.

BRIEF DESCRIPTION OF THE DRAWINGS

The disclosure will now be described with reference to the drawings wherein.

DESCRIPTION OF EXEMPLARY EMBODIMENTS

Figure 1:
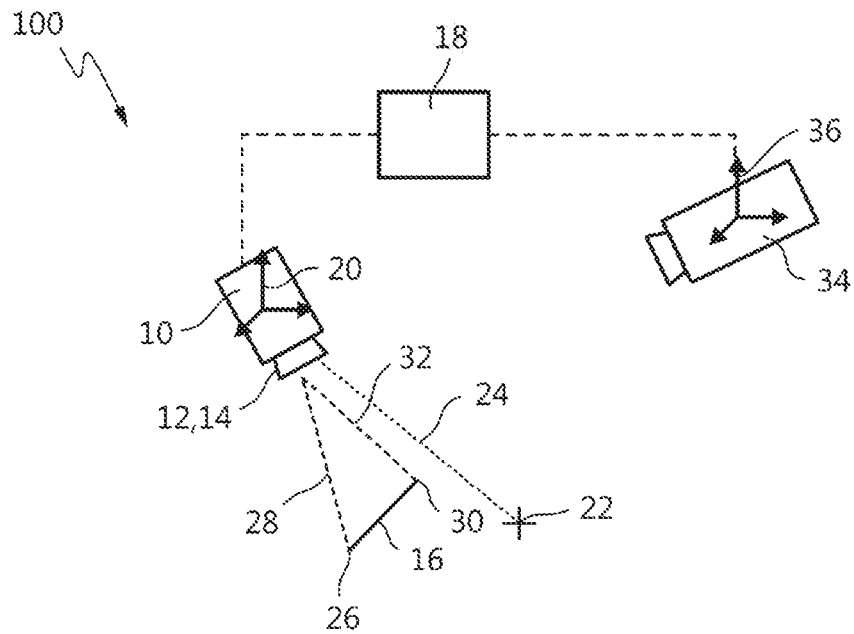
FIG. 1 shows a coordinate measuring system according to a first exemplary embodiment of the disclosure.

FIG. 1 shows coordinate measuring system 100. The coordinate measuring system 100 includes a scanning module 10. The scanning module 10 includes a laser line scanner 12 and a projection device 14. The laser line scanner 12 is configured to produce a laser line 16 on a surface of a workpiece not illustrated here.

To provide the laser line, the laser line scanner 12, e.g., fans-open a laser beam by an optic, such as, e.g., a cylindrical lens or a moving mirror, wherein the fanned-open laser beam forms the laser line 16 when striking the surface of the workpiece. The laser line scanner 12 is configured to capture a reflected component of the laser line 16 in the form of scan data. The scan data can be evaluated by an evaluation device 18.

The scanning module 10 is connected to the evaluation device 18, typically by way of one or more cables or wireless (e.g., by a short-distance network such as Bluetooth®, for example) or a long-distance network (e.g., WLAN). In the exemplary embodiment shown in FIG. 1, the evaluation device 18 is connected to the scanning module 10 by a plurality of cables. The evaluation device 18 is configured to determine a geometry of the surface of the workpiece in a first coordinate system 20 that is fixed with respect to the scanning module 10 (see FIG. 4) from the scan data captured by the laser line scanner 12. By way of example, the evaluation device 18 can be integrated in the laser module 10 or arranged separately therefrom. The evaluation device 18 can typically be configured to include the coordinate measuring history and/or predefined geometric relations of a coordinate measuring structure during the evaluation. The captured scan data can be transferred from the scanning module 10 or the laser line scanner 12 to the evaluation device 18 by way of the connection, respectively.

By way of example, the evaluation device 18 can be realized by one or more computers, microcontrollers, system(s) on a chip (SoC(s)). In other exemplary embodiments, the evaluation device 18 can also be realized, for example, by a server or a cloud server. By way of example, a script for evaluating the scan data can be executed on the server, said script typically including an evaluation algorithm.

By way of example, the projection device 14 may include one or more projectors and said projection device is configured to project a first optical marker 22 onto the surface of the workpiece along a first direction 24. The first direction 24 is known in the first coordinate system 20. The first optical marker 22 is at a distance from the laser line 16, i.e., it does not lie on the latter. In the representation shown here, the first optical marker 22 is disposed to the right of the laser line 16.

In FIG. 1, the laser line scanner 12 is further configured to project a second optical marker 26 onto the laser line 16 along a second direction 28. The second direction 28 is known in the first coordinate system 20. In FIG. 1, the second optical marker 26 is embodied as one of the two endpoints of the laser line 16. This positioning is merely exemplary. In other exemplary embodiments, the second optical marker 26 can also be projected onto the laser line 16 at a different position.

Moreover, the laser line scanner 12 is configured to project a third optical marker 30 onto a second of the two endpoints of the laser line 16 along a third direction 32. The third direction 32 is known in the first coordinate system 20. Proceeding from an origin of the first coordinate system 20, the first to third direction 24, 28, and 32 each extend obliquely in relation to one another.

In other exemplary embodiments, the third optical marker 30 can also be projected, for example as an identifiable point or as a cross, onto one of the two endpoints of the laser line 16 by the projection device 14. Consequently, only the first optical marker 22 is projected onto the workpiece surface at a distance from the laser line 16 by the projection device 14 in this exemplary embodiment.

The arrangement of the second and third optical marker 26 and 30 on the laser line 16 and of the first optical marker at a distance from the laser line 16 correspond to the aforementioned first case.

Consequently, the two endpoints of the laser line 16 serve in FIG. 1 as a second and third optical marker 26 and 30, without a separate labelling of these two points has to be realized.

By way of example, the evaluation of the two endpoints as second and third optical markers 26 and 30 can be implemented by way of the evaluation of the reflected laser radiation or, additionally, in geometric fashion by way of the aperture angle of the fan-like laser beam and the working distance from the scanning module 10 to the workpiece surface. By way of example, the start and the endpoint of each line can be detected as the optical markers 26 and 30 during the grid-like, point-by-point or line-by-line evaluation by the evaluation device 18. Consequently, both the fourth position of the second optical marker 26 and a fifth position of the third optical marker 30 are determinable in the first coordinate system 20.

The coordinate measuring system 100 further includes an optical sensor 34. The optical sensor 34 defines a second coordinate system 36 that is body-fixed with respect to the optical sensor 34. The optical sensor 34 is configured to capture image data of the first to third optical marker 22, 26, and 30. Typically, the optical sensor 34 includes an image recording region, by which the entire coordinate measuring structure, for example the scanning module 10 together with the workpiece to be measured, is capturable. Typically, the optical sensor 34 can be one or more cameras or any other type of optical capturing device. The optical sensor 34 is connected to the evaluation device 18, typically by way of one or more cables or wirelessly (e.g., by a short-distance network such as Bluetooth®, for example) or a long-distance network (e.g., WLAN). The captured image data of the optical sensor 24 can be transferred to the evaluation device 18 by the connection.

The evaluation device 18 is configured to determine a first position of the first optical marker 22, a second position of the second optical marker 26, and a third position of the third optical marker 30 in the second coordinate system 36 on the basis of the image data captured by the optical sensor 34. By way of example, this can be implemented by the mathematical-physical principle of triangulation. Further, the evaluation device 18 in FIG. 1 determines a fourth position of the second optical marker 26 and a fifth position of the third optical marker 30 in the first coordinate system 20 on the basis of the scan data, which are transferred to the evaluation device 18 by the laser line scanner 12. The fourth position and the fifth position can be determined on the basis of the predetermined position of the respective optical marker 26 and 30 on the laser line 16, for example. The respective positioning (in this case the two endpoints of the laser line 16) during a measuring process can be determined on account of the reflected laser radiation (the scan data), for example.

The evaluation device 18 determines a position and orientation of the first coordinate system 20 with respect to the second coordinate system 36 on the basis of the first to third position, the fourth position and the first to third direction 24, 28, and 32 or on the basis of the first to third position, the fifth position and the first to third direction 24, 28, and 32. The evaluation device 18 can determine a sixth position of the first optical marker 26 on the basis of the first to third position, the fourth position and the first to third direction 24, 28, and 32 or on the basis of the first to third position, the fifth position and the first to third direction 24, 28, and 32. The evaluation device 18 can determine a transformation (transformation matrix) by way of the determined position and orientation of the two coordinate systems 20 and 36 in relation to one another. The geometry of the workpiece captured in the first coordinate system 20 can be transformed into the second coordinate system 36 by the transformation. Consequently, the geometry of the workpiece is determinable in the second coordinate system 36 and can be included, for example, in quality control or further manufacturing steps.

Figure 2:
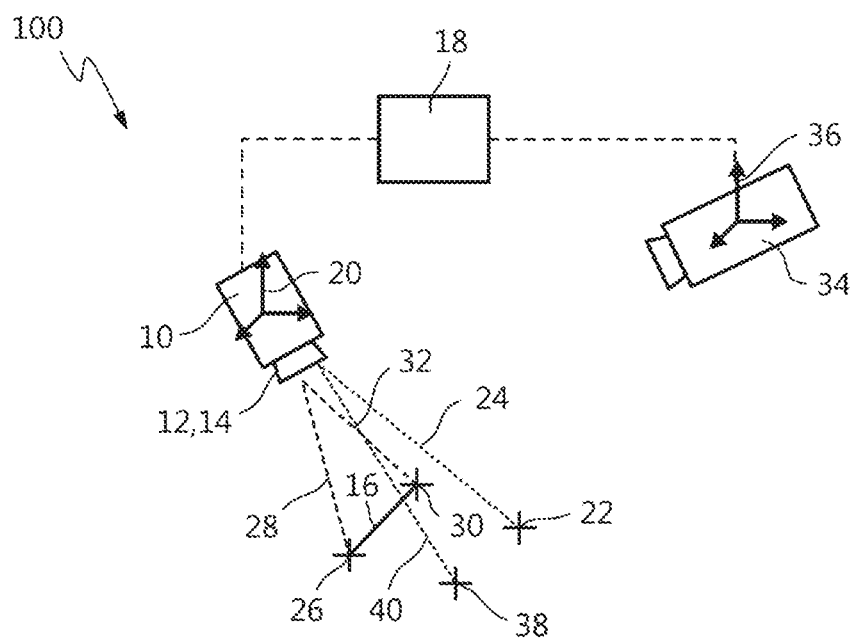
FIG. 2 shows a coordinate measuring system according to a second exemplary embodiment.

FIG. 2 shows a second exemplary embodiment of the coordinate measuring system 100. The system components of the coordinate measuring system 100 of FIG. 2 correspond to the system components of the coordinate measuring system 100 shown in FIG. 1. FIG. 2 shows the arrangement of the optical markers 22, 26, and 30 in the first case, wherein the second and third optical marker 26 and 30 are respectively disposed on the first and the second of the two endpoints of the laser line 16 and are each labeled as a cross in FIG. 2. In FIG. 2, both the second and the third optical marker 26 and 30 are projected by the laser line scanner 12. In other exemplary embodiments, the third optical marker 36, for example, can be projected onto the second endpoint of the two endpoints of the laser line 16 by the projection device 14.

In addition to the first optical marker 22, the projection device 14 projects a fourth optical marker 38 in a fourth direction 40 in FIG. 2. The fourth direction 40 is known in the first coordinate system 20. By way of example, the fourth optical marker 38 can be used for additional verification of the position and orientation of the first coordinate system 20 with respect to the second coordinate system 36, as determined by the evaluation device 18. By way of example, the fourth optical marker 38 can also be used as an alternative to the first optical marker 22 in other exemplary embodiments, should said first optical marker lie outside the field of view of the optical sensor 34, for example as a result of covering.

Figure 3:
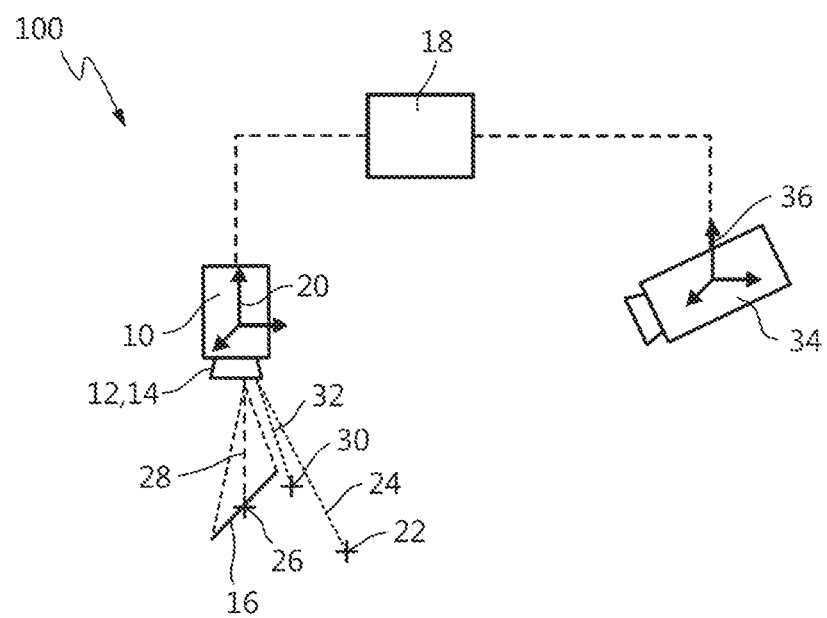
FIG. 3 shows a coordinate measuring system according to a third exemplary embodiment.

FIG. 3 shows a third exemplary embodiment of the coordinate measuring system 100. In FIG. 3, the laser line scanner 12 or the projection device 14 is configured to project the second optical marker 26 onto the laser line 16 along the second direction 28. In the exemplary embodiment shown in FIG. 3, the projection device 14 projects the second optical marker 26. In FIG. 1, the second optical marker 26 is labeled as a cross and positioned centrally in relation to the length of the laser line 16. This positioning is merely exemplary. In other exemplary embodiments, the second optical marker 26 can also be projected onto the laser line 16 at a different position.

The laser line scanner 12 or the projection device 14 is configured to project the third optical marker 30 onto the surface of the workpiece along the third direction 32. In the exemplary embodiment shown in FIG. 3, the projection device 14 projects the third optical marker 30.

The arrangement of the optical markers 22, 26, and 30 in FIG. 3 corresponds to the aforementioned second case. In the second case, both the second optical marker 26 and the third optical marker 30 are projected onto the laser line 16. Only the first optical marker 22 is projected onto the surface of the workpiece at a distance from the laser line 16.

In FIG. 3, the optical markers 22, 26, and 30 are labeled as a cross in each case. This labelling as a cross is purely exemplary in nature. In other exemplary embodiments, the optical markers 22, 26, and 30 may have, for example, a plurality of arbitrary shapes, sizes, and colors, which are projectable by the laser line scanner 12 or the projection device 14. Proceeding from an origin of the first coordinate system 20, the first to third direction 24, 28, and 32 each extend obliquely in relation to one another.

In FIG. 3, the evaluation device 18 for determining the position and orientation of the first coordinate system 20 with respect to the second coordinate system 36 determines the fifth position of the third optical marker 30 on the basis of the first to fourth position and on the basis of the first to third direction. In addition thereto, the evaluation device 18 determines the sixth position of the first optical marker 26 on the basis of the first to fourth position and on the basis of the first to third direction 24, 28, and 32.

Figure 4:
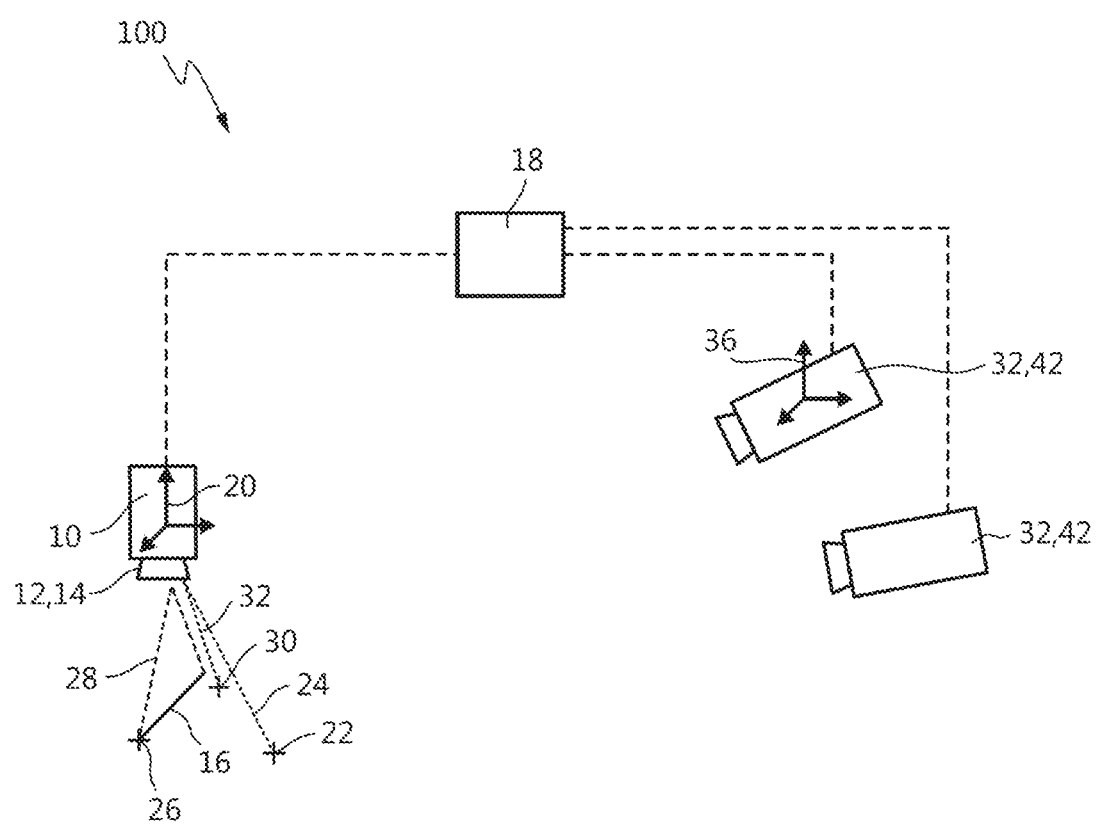
FIG. 4 shows a coordinate measuring system according to a fourth exemplary embodiment.

FIG. 4 shows a fourth exemplary embodiment of the coordinate measurement system 100. FIG. 4 shows the arrangement of the optical markers 22, 26, and 30 in the second case. The second optical marker 26 lies on the first of the two endpoints of the laser line 16. Moreover, the optical sensor 34 in FIG. 4 includes two cameras 42, which are each connected to the evaluation device 18 by way of a plurality of cables. A connection by way of only one cable or wirelessly is also realizable.

The two cameras 42 capture the coordinate measuring structure from two different viewing angles or image regions, respectively, and can capture the position of the first to third optical marker 22, 26, and 30, for example by way of the principle of triangulation. In other exemplary embodiments, the two cameras 42 may also be disposed in a common housing. The two cameras 42 are typically calibrated both intrinsically and extrinsically. That is to say, the two cameras 42 are typically calibrated both by a respective self-calibration and by a calibration among one another. In other exemplary embodiments, more than two cameras 42 may also be present and disposed at different positions in space.

Figure 5:
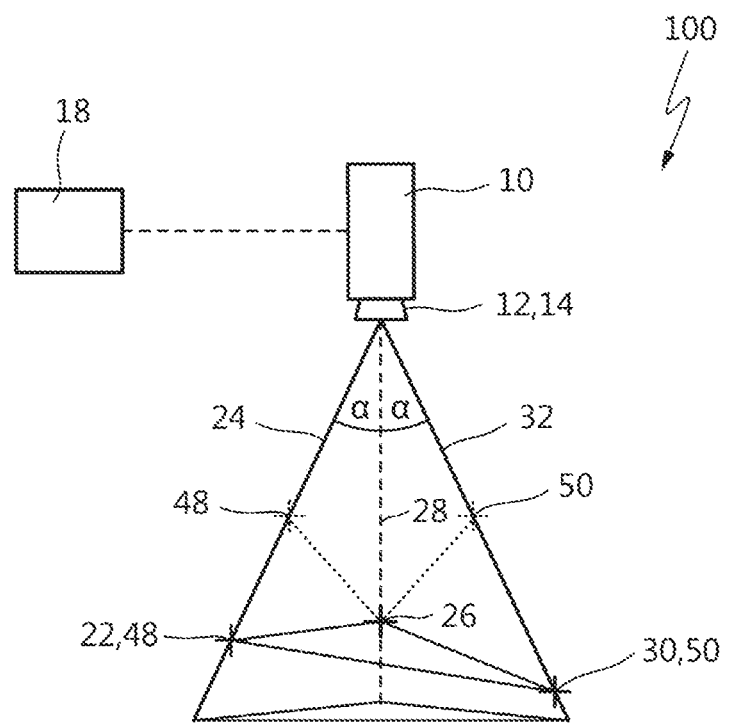
FIG. 5 shows a coordinate measuring system according to a fifth exemplary embodiment.

FIG. 5 shows a fifth exemplary embodiment of the coordinate measuring system 100 in the second case, in a simplified representation without the optical sensor 34. This serves to explain the mathematical method. In FIG. 5, the optical sensor 34 is also part of the coordinate measuring system 100, however, it is not illustrated.

In FIG. 5, the first to third direction 24, 28, and 32 each extend obliquely to one another. In addition to the oblique extent, the first to third direction 24, 28, and 32 include angles of inclination a of the same magnitude among one another. A regular tetrahedron, shown in the side view in FIG. 5, arises as a result of the same angle of inclination a. In FIG. 5, the optical markers 22, 26, and 30 are disposed in accordance with the second case.

In the fifth exemplary embodiment, the evaluation device 18 is configured to determine a first distance 44 between the first and the second optical marker 22 and 26, and a third distance 46 between the second and the third optical marker 26 and 30 by evaluating the image data of the optical sensor 34.

The evaluation device 18 determines two first points of intersection 48 with the first direction 24 on the basis of the first distance 44. One of the two first points of intersection 48 corresponds to the sixth position of the first optical marker 22 in the first coordinate system 20. In the case shown here, the one of the two first points of intersection 48, which has a greater distance from the laser line scanner 12 along the first direction 24 than the other one of the two first points of intersection 48, corresponds to the sixth position of the first optical marker 22.

The evaluation device 18 determines two third points of intersection 50 with the third direction 24 on the basis of the third distance 46. One of the two third points of intersection 50 corresponds to the fifth position of the third optical marker 22 in the first coordinate system 20. In the case shown here, the one of the two third points of intersection 50, which has a greater distance from the laser line scanner 12 along the first direction 24 than the other one of the two third points of intersection 50, corresponds to the fifth position of the third optical marker 30.

Figure 6:
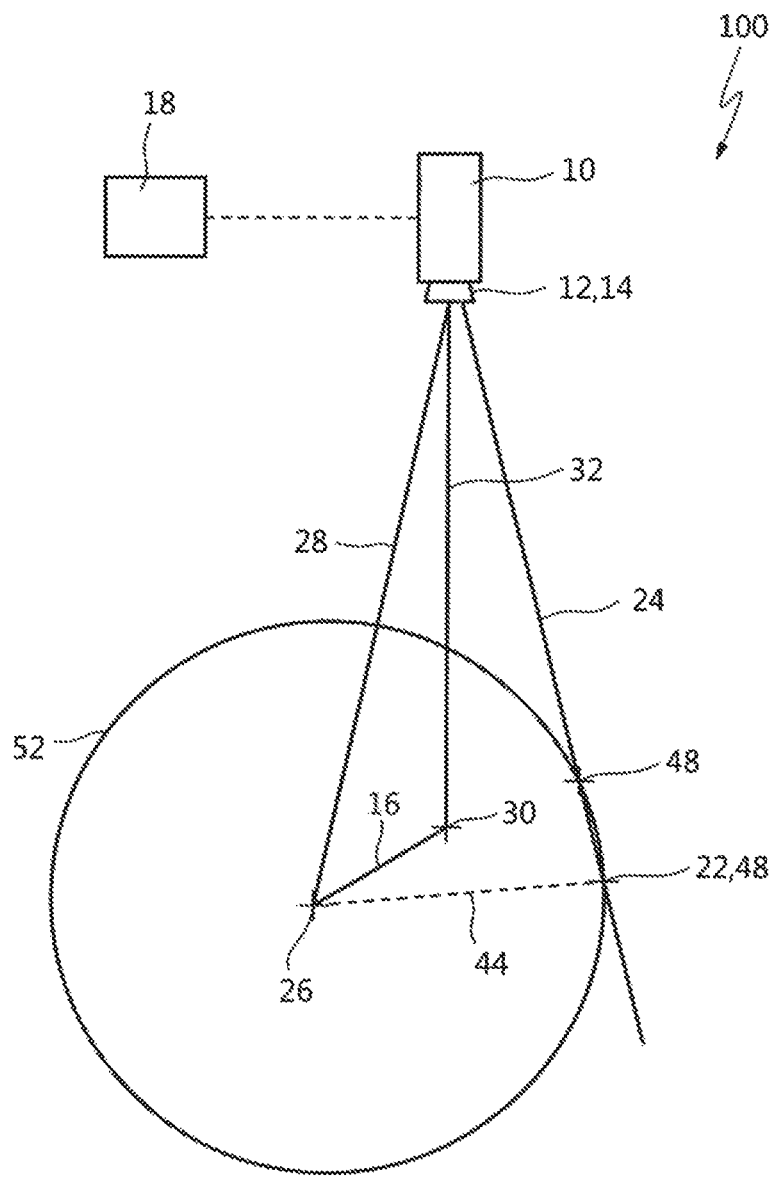
FIG. 6 shows a geometric representation of the solution of a first intersection equation in a first case.

FIG. 6 shows the arrangement of the optical markers 22, 26, and 30 in the first case. The coordinate measuring system 100 is represented in simplified fashion without the optical sensor 34 in order to geometrically present the mathematical principle of the evaluation. In FIG. 6, the optical sensor 34 is also part of the coordinate measuring system 100, however, it is not illustrated.

In the case shown in FIG. 6, the evaluation device is typically configured to determine the two first points of intersection 48 by solving an intersection equation of a first enveloping sphere 52 with a straight line along the first direction 24. Here, the first enveloping sphere 52 is defined by way of the fourth position of the second optical marker 26 as a sphere center and the first distance 44 as a first radius. The first enveloping sphere 52 is shown in the side view in FIG. 6 and consequently represented as a circle, which intersects with the straight line along the first direction 24. The straight line along the first direction 24 forms a secant of the first enveloping sphere 52 in the mathematical sense. The one of the two first points of intersection 48 corresponds to the sixth position of the first optical marker 22 in the first coordinate system 20.

Figure 7:
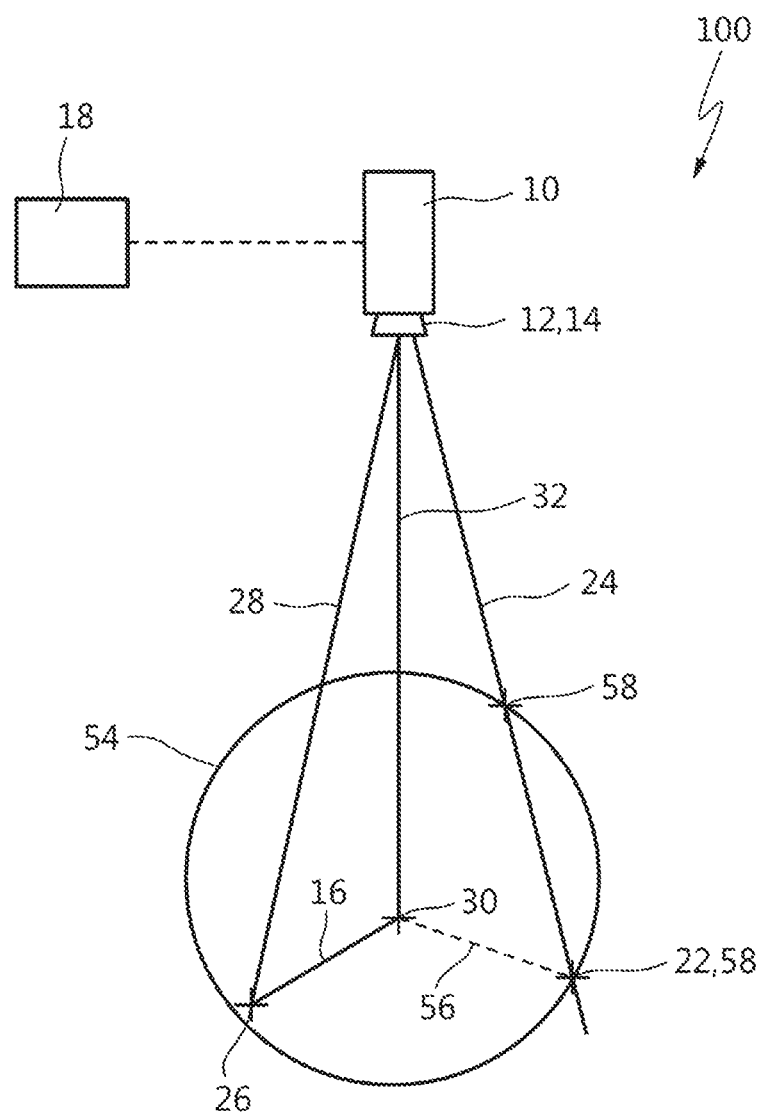
FIG. 7 shows a geometric representation of the solution of a second intersection equation in the first case.

FIG. 7 shows an alternative determination method for the sixth position of the first optical marker 22 in the first coordinate system 20, when the optical markers 22, 26, and 30 are disposed according to the first case. In the first case, the evaluation device 18 may also solve a second intersection equation of a second enveloping sphere 54 with the straight line along the first direction 24, as an alternative or in addition to the mathematical determination of the sixth position shown in FIG. 6. The second enveloping sphere 54 is defined by way of the fifth position of the third optical marker as a sphere center and a second distance 56 as a second radius. The second distance 56 is the absolute distance between the first optical marker 22 and the third optical marker 30, and it is determined by the evaluation device 18 on the basis of the image data.

The second enveloping sphere 56 is shown in the side view in FIG. 7 and consequently represented as a circle, which intersects with the straight line along the first direction 24. The straight line along the first direction 24 forms a secant of the second enveloping sphere 56 in the mathematical sense. The secant intersects the second enveloping sphere 56 at two second points of intersection 58. The one of the two second points of intersection 58 corresponds to the sixth position of the first optical marker 22 in the first coordinate system 20.

Figure 8:
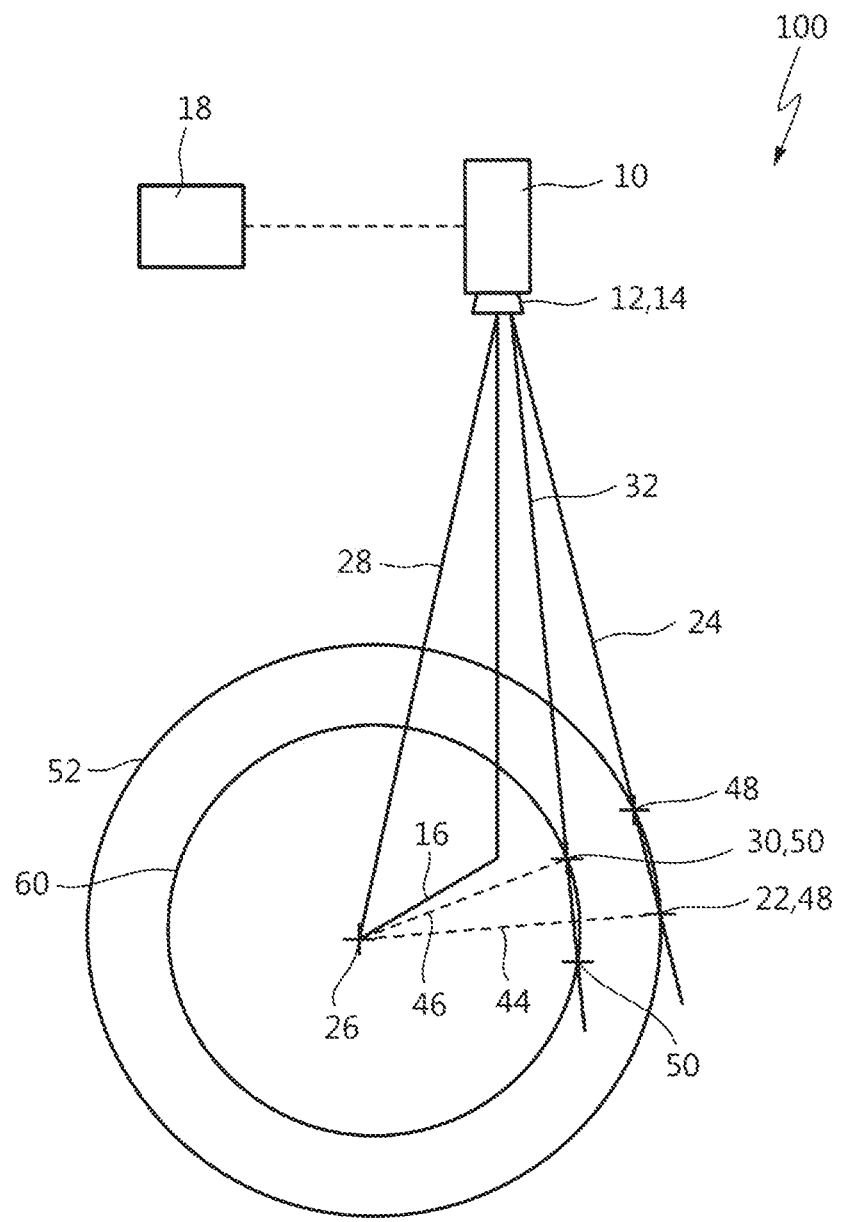
FIG. 8 shows a geometric representation of the solution of a third and a fourth intersection equation in a second case.

FIG. 8 shows the mathematical determination of the fifth position of the third optical marker 30 and of the sixth position of the first optical marker 22 in the second case. For the mathematical evaluation in the second case, the evaluation device 18 is configured to likewise solve a third intersection equation of a third enveloping sphere 60 with a straight line along the third direction 32 in addition to the first intersection equation presented in FIG. 6. The third enveloping sphere 60 is defined by way of the fourth position of the second optical marker as a sphere center and the third distance 56 as a third radius.

The third enveloping sphere 60 is shown in the side view in FIG. 8 and consequently represented as a circle, which intersects with the straight line along the third direction 32. The straight line along the third direction 32 forms a secant of the third enveloping sphere 60 in the mathematical sense. The secant intersects the third enveloping sphere 60 at the two third points of intersection 50. The one of the two third points of intersection 50 corresponds to the fifth position of the third optical marker 30 in the first coordinate system 20.

Figure 9:
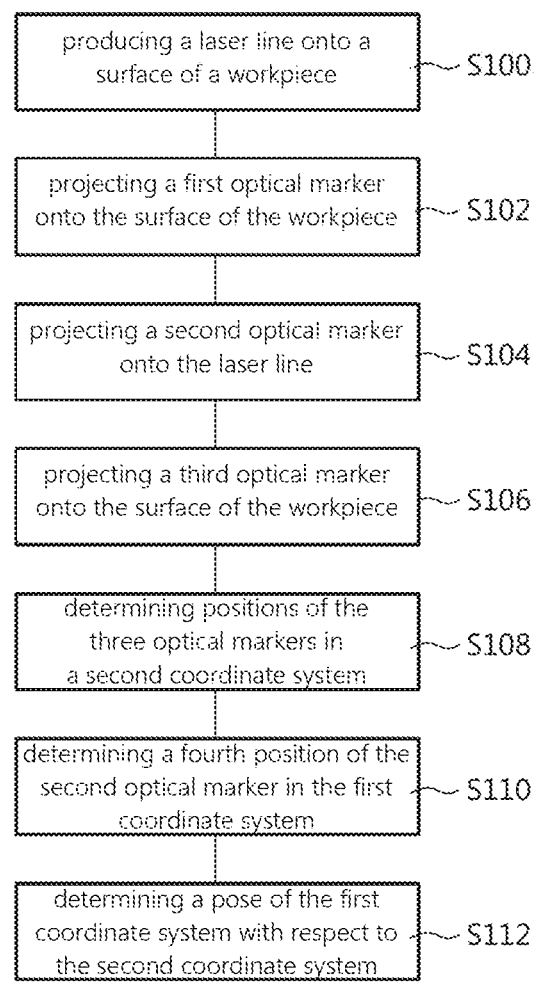
FIG. 9 shows a method flowchart of a coordinate measuring method.
Figure 10:
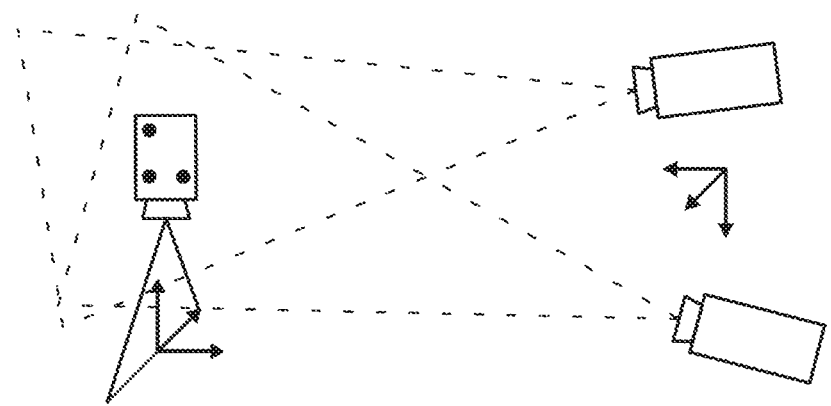
FIG. 10 shows a schematic representation of a first exemplary embodiment of a measurement system.
Figure 11:
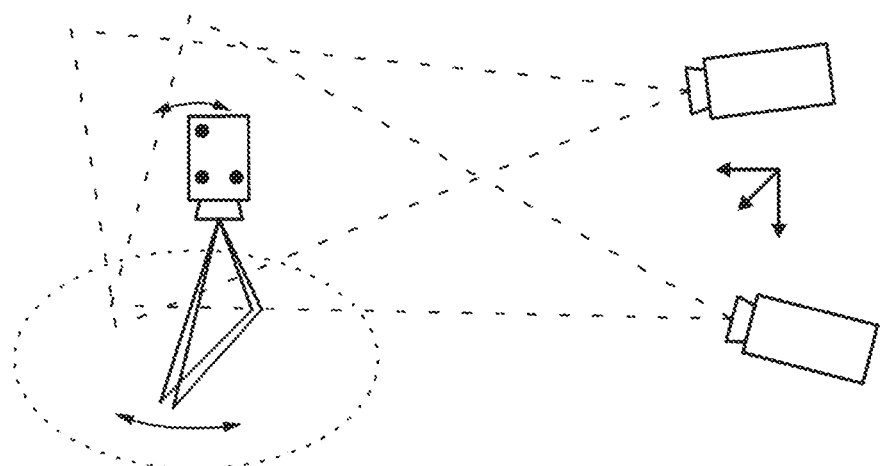
FIG. 11 shows a schematic representation of a second exemplary embodiment of a measurement system.
Figure 12:
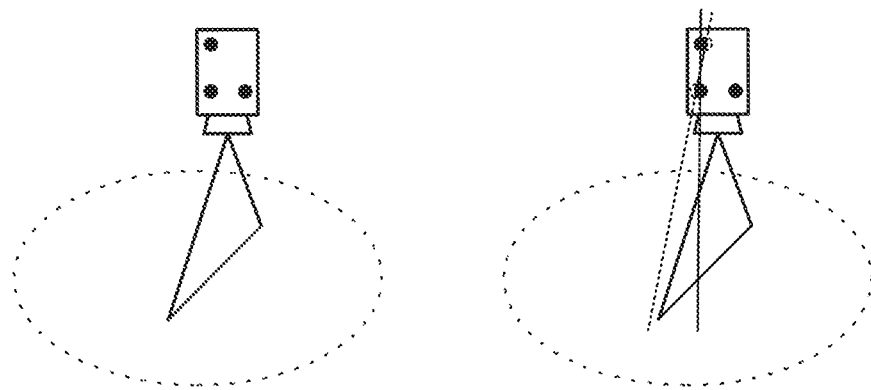
FIG. 12 shows a schematic representation of a third exemplary embodiment of a measurement system.

FIG. 9 shows a method flowchart of the coordinate measuring method, including the steps set forth below. The laser line 16 is produced on a surface of a workpiece in a step S100. In a step S102, the first optical marker 22 is projected onto the surface of the workpiece, wherein the first optical marker 22 lies away from the laser line 16, wherein the first optical marker 22 is disposed along the first direction 24 that is known in the first body-fixed coordinate system 20. Further, in a step S104, the second optical marker 26 is projected onto the laser line 16, wherein the second optical marker 26 is disposed along the second direction 28 that is known in the first coordinate system 20. In step S106, the third optical marker 30 is projected onto the surface of the workpiece, wherein the third optical marker 30 is disposed along the third direction 32 that is known in the first coordinate system. In step S108, the first position of the first optical marker 22, the second position of the second optical marker 26 and the third position of the third optical marker 30 are determined in the second body-fixed coordinate system 36. In step S110, the fourth position of the second optical marker 26 is determined in the first body-fixed coordinate system 20 and, in step S112, the position and orientation of the first coordinate system 20 is determined in the second coordinate system 36 on the basis of the first to fourth positions and the first to third direction 24, 28, and 32.

It is understood that the foregoing description is that of the exemplary embodiments of the disclosure and that various changes and modifications may be made thereto without departing from the spirit and scope of the disclosure as defined in the appended claims.

What is claimed is:

1. A coordinate measuring system comprising:
a scanning module including a laser line scanner and a projection device, and defining a first coordinate system body-fixed with respect to the scanning module;
the laser line scanner being configured to project a laser line onto a surface of a workpiece and to produce scan data from a reflection of the laser line being reflected from the surface of the workpiece;
the projection device being configured to project a first optical marker, spaced apart from the laser line, onto the surface of the workpiece;
the first optical marker being disposed along a first direction predefined in the first coordinate system;
the projection device or the laser line scanner being configured to:
project a second optical marker onto the laser line, the second optical marker being disposed along a second direction predefined in the first coordinate system, and
project a third optical marker onto the surface of the workpiece, the third optical marker being disposed along a third direction predefined in the first coordinate system;
an optical sensor defining a second coordinate system body-fixed with respect to the optical sensor and being configured to capture image data of the first optical marker, the second optical marker, and the third optical marker; and
an evaluation device configured to determine:
a first position of the first optical marker, a second position of the second optical marker, and a third position of the third optical marker in the second coordinate system based on the image data,
a fourth position of the second optical marker in the first coordinate system based on the scan data, and
a position and orientation of the first coordinate system with respect to the second coordinate system based on the first position, the second position, the third position, the fourth position, the first direction, the second direction, and the third direction.

2. The coordinate measuring system as claimed in claim 1, wherein:
the projection device or the laser line scanner is further configured to project the third optical marker onto the laser line, and
the evaluation device is configured to determine:
a fifth position of the third optical marker in the first coordinate system based on the scan data,
a sixth position of the first optical marker in the first coordinate system based on the first position, the second position, the third position, a fourth and/or fifth position, the first direction, the second direction, and the third direction, and
the position and the orientation of the first coordinate system with respect to the second coordinate system based on the fourth position, the fifth position, and the sixth position.

3. The coordinate measuring system as claimed in claim 1, wherein:
the projection device is further configured to project the third optical marker, spaced apart from the laser line, onto the surface of the workpiece, and
the evaluation device is configured to determine:
a fifth position of the third optical marker in the first coordinate system and a sixth position of the first optical marker in the first coordinate system based on the first position, the second position, the third position, the fourth position, the first direction, the second direction, and the third direction, and
the position and the orientation of the first coordinate system with respect to the second coordinate system based on the fourth position, the fifth position, and the sixth position.

4. The coordinate measuring system as claimed in claim 2, wherein the evaluation device is configured to determine:
a first distance between the first and the second optical marker and a second distance between the first and the third optical marker based on the first position, the second position, and the third position, and two first points of intersection with a first direction based on the first distance, one of the two first points of intersection corresponding to the sixth position of the first optical marker in the first coordinate system, or two second points of intersection with the first direction based on the second distance, one of the two second points of intersection corresponding to the sixth position of the first optical marker in the first coordinate system.

5. The coordinate measuring system as claimed in claim 4, wherein the evaluation device is further configured to determine:

the two first points of intersection by solving a first intersection equation of a first enveloping sphere with a first straight line along the first direction, the first enveloping sphere being defined by the fourth position as a center of the first enveloping sphere and the first distance as a radius of the first enveloping sphere, or the two second points of intersection by solving a second intersection equation of a second enveloping sphere with the first straight line, the second enveloping sphere being defined by the fifth position as a center of the second enveloping sphere, and the second distance as a radius of the second enveloping sphere.

6. The coordinate measuring system as claimed in claim 3, wherein the evaluation device is configured to determine:

a first distance between the first and the second optical marker and a third distance between the second and the third optical marker based on the first position, the second position, and the third position, two first points of intersection with a first direction based on the first distance, one of the two first points of intersection corresponding to the sixth position of the first optical marker in the first coordinate system, and two third points of intersection with the third direction based on the third distance, one of the two third points of intersection corresponding to the fifth position of the third optical marker in the first coordinate system.

7. The coordinate measuring system as claimed in claim 6, wherein the evaluation device is further configured to determine:

the two first points of intersection by solving a first intersection equation of a first enveloping sphere with a first straight line along the first direction, the first enveloping sphere being defined by the fourth position as a center of the first enveloping sphere, and the first distance as a radius of the first enveloping sphere, and the two third points of intersection by solving a third intersection equation of a third enveloping sphere with a third straight line along the third direction, the third enveloping sphere being defined by the fourth position as a center of the third enveloping sphere, and the third distance as a radius of the third enveloping sphere.

8. The coordinate measuring system as claimed in claim 4, wherein the evaluation device is configured to determine the fifth position from the two first points of intersection and/or the sixth position from the two second points of intersection or from two third points of intersection by including a coordinate measuring history.

9. The coordinate measuring system as claimed in claim 4, wherein the evaluation device is configured to determine the fifth position from the two first points of intersection and/or the sixth position from the two second points of intersection or from two third points of intersection by including predefined geometric relationships of a coordinate measuring structure of the coordinate measuring system.

10. The coordinate measuring system as claimed in claim 1, wherein:

the laser line scanner is configured to produce the laser line between two endpoints, and the second optical marker is disposed on a first one of the two endpoints.

11. The coordinate measuring system as claimed in claim 10, wherein:

the third optical marker is disposed on a second one of the two endpoints, the projection device or the laser line scanner is further configured to project the third optical marker onto the laser line, and the evaluation device is configured to determine:

a fifth position of the third optical marker in the first coordinate system based on the scan data, a sixth position of the first optical marker in the first coordinate system based on the first position, the second position, the third position, a fourth and/or fifth position, the first direction, the second direction, and the third direction, and the position and the orientation of the first coordinate system with respect to the second coordinate system based on the fourth position, the fifth position, and the sixth position.

12. The coordinate measuring system as claimed in claim 1, wherein each of the first direction, the second direction, and the third direction extends obliquely with respect to one another, proceeding from a common origin defined by the first coordinate system.

13. The coordinate measuring system as claimed in claim 12, wherein the first to the third direction include angles of inclination a of a same magnitude among one another.

14. A coordinate measuring method comprising:

producing a laser line onto a surface of a workpiece;

projecting a first optical marker onto the surface of the workpiece, the first optical marker being spaced apart from the laser line, and disposed along a first direction predefined in a body-fixed first coordinate system;

projecting a second optical marker onto the laser line, the second optical marker being disposed along a second direction predefined in the first coordinate system;

projecting a third optical marker onto the surface of the workpiece, the third optical marker being disposed along a third direction predefined in the first coordinate system;

determining a first position of the first optical marker, a second position of the second optical marker, and a third position of the third optical marker in a body-fixed second coordinate system;

determining a fourth position of the second optical marker in the first coordinate system; and determining a position and orientation of the first coordinate system with respect to the second coordinate system based on the first position, the second position, the third position, the fourth position, the first direction, the second direction, and the third direction.

15. The coordinate measuring method as claimed in claim 14, further comprising:

projecting the third optical marker onto the laser line;

determining a fifth position of the third optical marker in the first coordinate system;

determining a sixth position of the first optical marker in the first coordinate system based on the first position, the second position, the third position, a fourth and/or fifth position, the first direction, the second direction, and the third direction; and determining the position and the orientation of the first coordinate system with respect to the second coordinate system based on the fourth position, the fifth position, and the sixth position.

16. The coordinate measuring method as claimed in claim 14, further comprising:
projecting the third optical marker onto the surface of the workpiece, the third optical marker being spaced apart from the laser line;
determining a fifth position of the third optical marker in the first coordinate system and a sixth position of the first optical marker in the first coordinate system based on the first position, the second position, the third position, the fourth position, the first direction, the second direction, and the third direction; and
determining the position and the orientation of the first coordinate system with respect to the second coordinate system based on the fourth position, the fifth position, and the sixth position.

17. The coordinate measuring method as claimed in claim 15, further comprising:
determining, based on the first position, the second position, and the third position, a first distance between the first optical marker and the second optical marker and a second distance between the first optical marker and the third optical marker; and
determining two first points of intersection with a first direction based on the first distance, one of the two first points of intersection corresponding to the sixth position of the first optical marker in the first coordinate system; or
determining two second points of intersection with the first direction based on the second distance, one of the two second points of intersection corresponding to the sixth position of the first optical marker in the first coordinate system.

18. The coordinate measuring method as claimed in claim 17, further comprising:
determining the two first points of intersection by solving a first intersection equation of a first enveloping sphere with a first straight line along the first direction, the fourth position as a center of the first enveloping sphere, and the first distance as a radius of the first enveloping sphere; or
determining the two second points of intersection by solving a second intersection equation of a second enveloping sphere with the first straight line, the second enveloping sphere being defined by way of the fifth position as a center of the second enveloping sphere, and the second distance as a radius of the second enveloping sphere.

19. The coordinate measuring method as claimed in claim 16, further comprising:
determining, based on the first position, the second position, and the third position, a first distance between the first optical marker and the second optical marker and a third distance between the second optical marker and the third optical marker;
determining two first points of intersection with the first direction based on the first distance, one of the two first points of intersection corresponding to the sixth position of the first optical marker in the first coordinate system; and
determining two third points of intersection with the third direction based on the third distance, one of the two third points of intersection corresponding to the fifth position of the third optical marker in the first coordinate system.

20. A coordinate measuring system comprising:
a scanner configured to:
produce a laser line onto a surface of a workpiece,
project a first optical marker onto the surface of the workpiece, the first optical marker being spaced apart from the laser line and disposed along a first direction predefined in a body-fixed first coordinate system,
project a second optical marker onto the laser line, the second optical marker being disposed along a second direction predefined in the first coordinate system, and
project a third optical marker onto the surface of the workpiece, the third optical marker being disposed along a third direction predefined in the first coordinate system; and
a computation device comprising electronic circuitry and configured to determine:
a first position of the first optical marker, a second position of the second optical marker, and a third position of the third optical marker in a body-fixed second coordinate system,
a fourth position of the second optical marker in the first coordinate system, and
a position and orientation of the first coordinate system with respect to the second coordinate system based on the first position, the second position, the third position, the fourth position, the first direction, the second direction, and the third direction.

* * * * *